United States Patent [19]
Makarem

[11] 3,951,020
[45] Apr. 20, 1976

[54] CENTERING ASSEMBLIES FOR LATHES

[76] Inventor: George Abdelmalak Makarem, c/o Department of Mechanical Engineering, Ahmadu Bello University, Zaria, Nigeria

[22] Filed: Dec. 27, 1974

[21] Appl. No.: 536,823

[30] Foreign Application Priority Data
Jan. 14, 1974 United Kingdom............. 1667/74

[52] U.S. Cl................... 82/33 R; 408/72 R
[51] Int. Cl.²............ B23B 23/02; B23B 39/00
[58] Field of Search............ 82/33 R, 33 A, 45; 408/72, 75, 200

[56] References Cited
UNITED STATES PATENTS

| | | | |
|---|---|---|---|
| 707,573 | 8/1902 | Fleming | 408/72 |
| 2,430,997 | 11/1947 | Schmidt, Jr. | 82/33 R |
| 3,099,173 | 7/1963 | Paslawsky et al. | 82/45 |

FOREIGN PATENTS OR APPLICATIONS

| | | | |
|---|---|---|---|
| 541,581 | 12/1941 | United Kingdom | 82/33 R |
| 1,124,321 | 2/1962 | Germany | 82/33 R |
| 123,775 | 1/1949 | Sweden | 82/33 R |

*Primary Examiner*—Harrison L. Hinson
*Attorney, Agent, or Firm*—Hane, Baxley & Spiecens

[57] ABSTRACT

An improved centering assembly for a lathe in which a drill is axially housed in a rotatable centre for the lathe. The drill is movable from a retracted position within the centre to an extended position where it axially projects from the centre to drill a centre hole in a workpiece.

9 Claims, 7 Drawing Figures

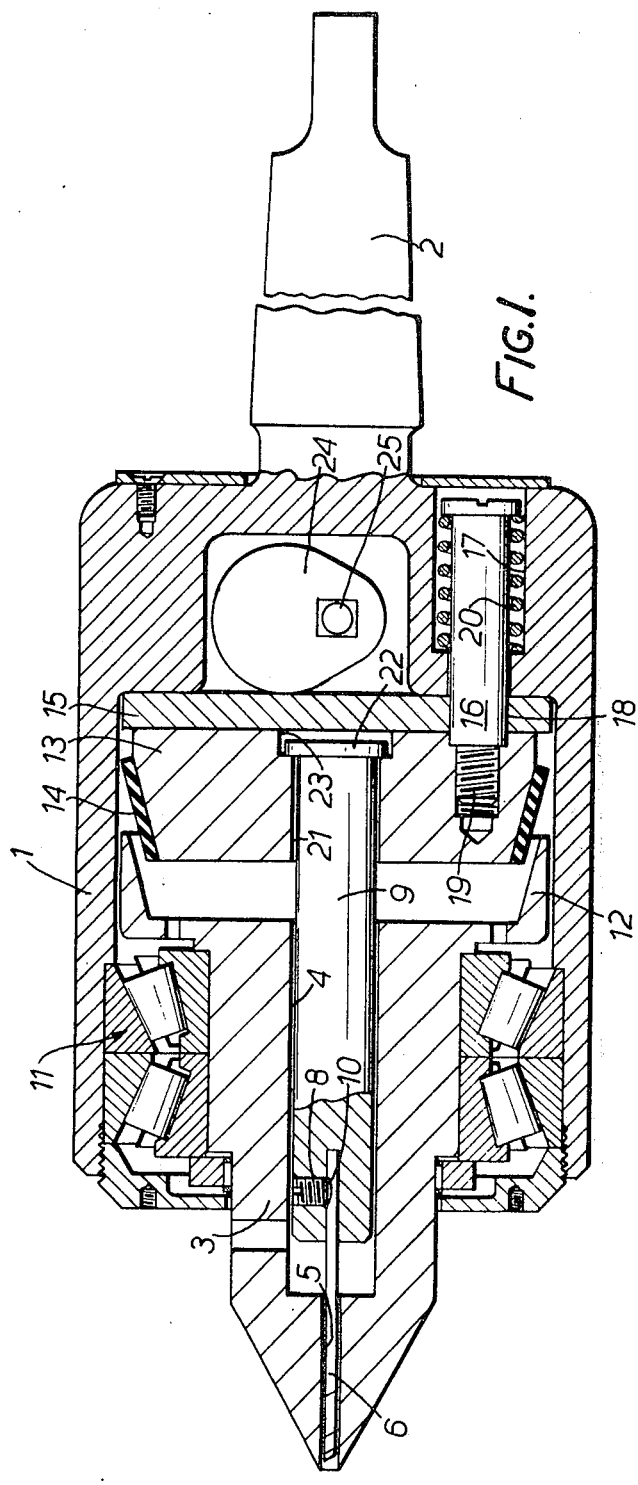

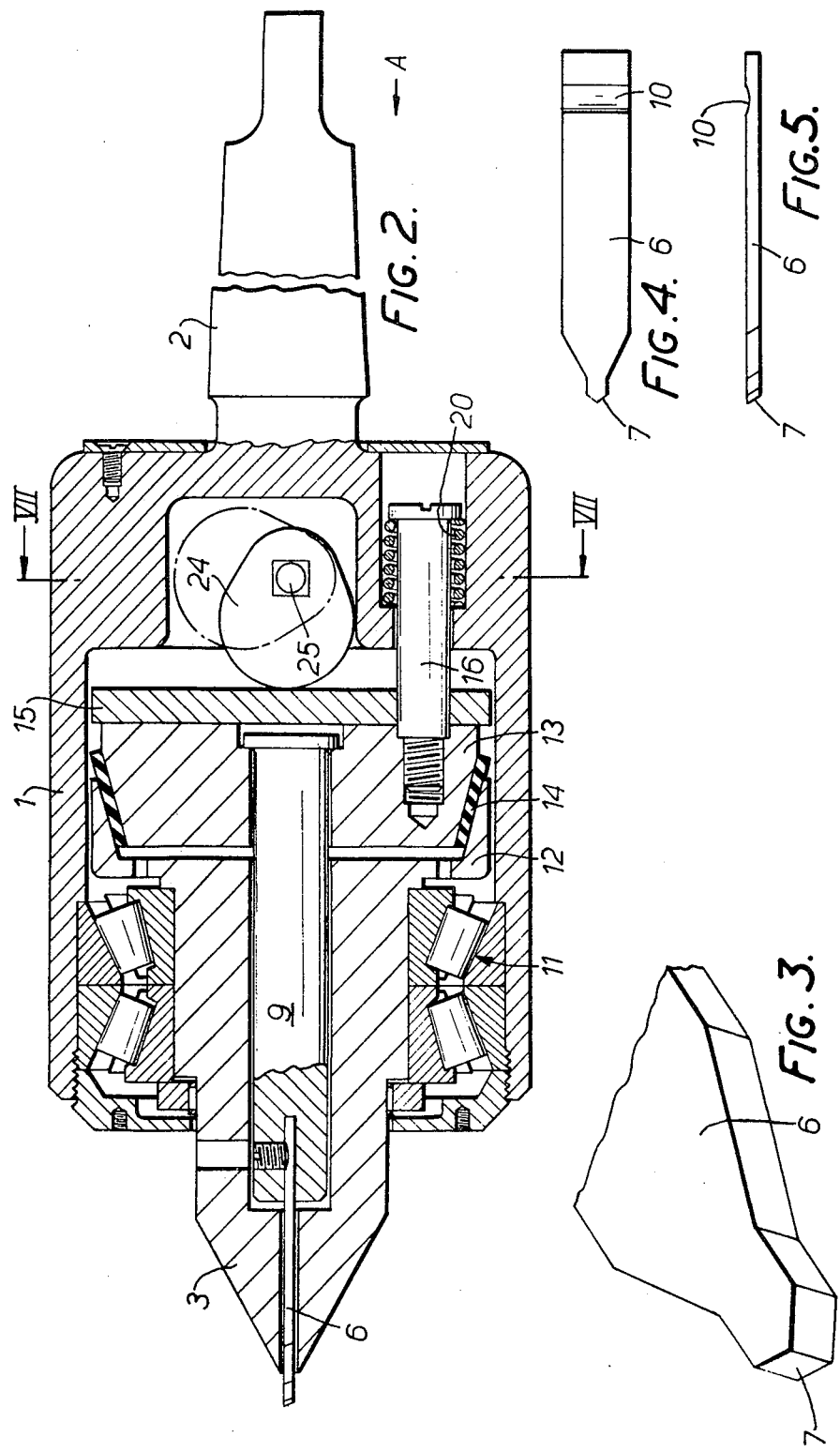

CENTERING ASSEMBLIES FOR LATHES

FIELD OF INVENTION

The invention relates to a centering arrangement for a lathe.

BACKGROUND OF THE INVENTION

To centre a workpiece on a lathe a hole is first drilled at one end of the workpiece and secondly a centre of the lathe is located in the hole so as to rotatably mount the workpiece in the lathe.

Conventionally, the hole is drilled by mounting the workpiece in the lathe and using a Jacob's chuck and a centre drill. However, this is a relatively complicated centering procedure since the Jacob's chuck is first installed in the lathe, the centre hole is then drilled in the workpiece, the Jacob's chuck is then removed, a centre is then installed in the lathe, and finally the centre is engaged with the drilled hole in the workpiece.

To simplify the centering procedure at the lathe, some workshops have a drilling apparatus remote from the lathe to drill the centre hole. However, centering the workpiece on the lathe takes a relatively long time using such drilling apparatus.

SUMMARY OF THE INVENTION

It is an object of the invention to provide a centering assembly for a lathe which permits a centre hole to be drilled on the lathe and permits a centre to be located in the drilled hole in an improved, faster and simplified manner.

My invention includes a centering assembly for centering a workpiece in a lathe including a rotatable centre having an opening along the axis of rotation thereof, a drill in said opening, and means for moving the drill along said axis of rotation from a retracted position within the centre to an extended position for drilling said workpiece.

Preferably holding means are provided to prevent rotation of the centre when the drill is moved to the extended position.

Further objects and advantages of the invention will appear from the following description of a preferred embodiment thereof given by way of example with reference to the accompanying drawings.

BRIEF DESCRIPTION OF THE DRAWINGS

FIG. 1 is an axial section through an embodiment of centering assembly according to the present invention, and showing the drill means in its retracted position;

FIG. 2 is an axial section of the assembly of FIG. 1 but showing the drill means in its extended position;

FIGS. 3 to 5 are respectively a perspective view, plan view and side view of a drill means for use in the assembly of FIG. 1;

DESCRIPTION OF PREFERRED EMBODIMENT

Figure 6:
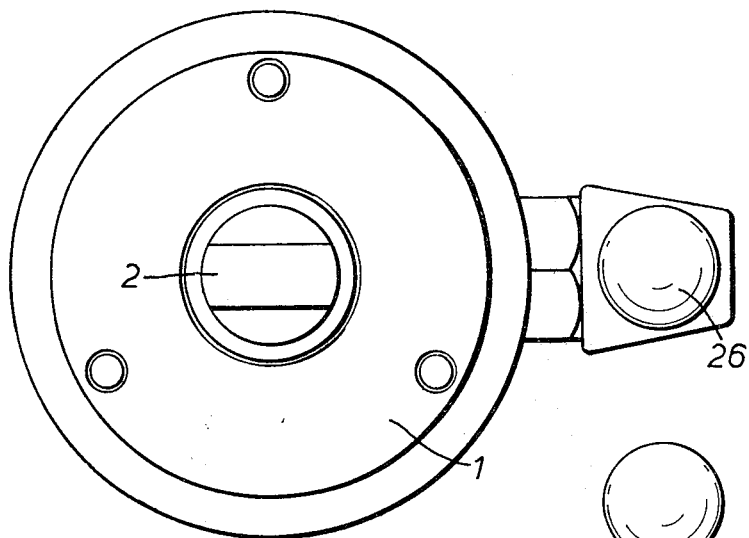
FIG. 6 is an end view of the assembly of FIG. 2 in the direction of the arrow A.
Figure 7:
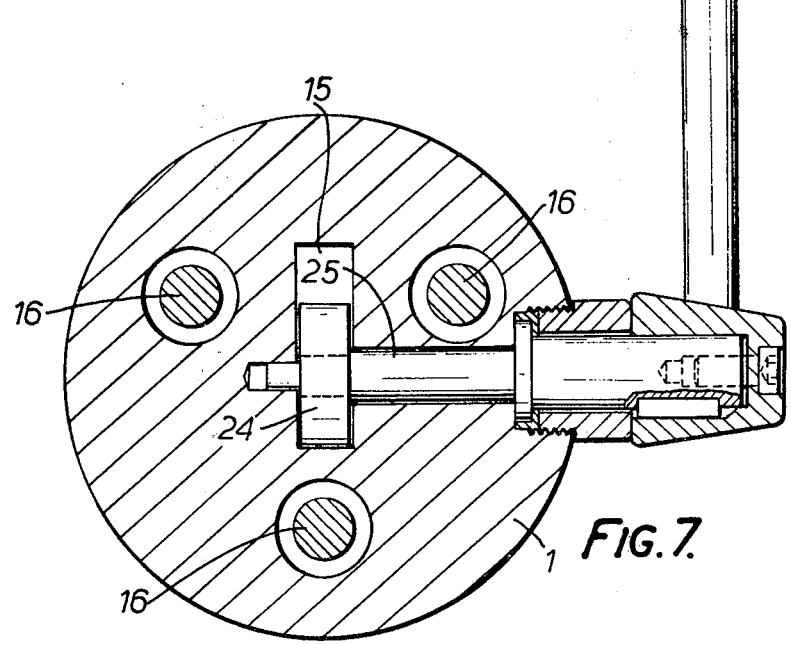
FIG. 7 is a section on the line VII–VII of FIG. 2.

As shown in the drawings, the centering assembly comprises a housing 1 provided with a shank 2 having a morse taper for receipt in the tail stock barrel of a lathe. A centre 3 is mounted in the housing and is provided with an axial bore 4 terminating in a slot 5 opening at the outer end of the centre. A flat drill 6 is received in the slot 5 for axial sliding movement relative thereto between a retracted position with the within (FIG. 1) and an extended drilling position (FIG. 2). The drill 6 is shown in FIGS. 3 to 5 and has a cutting edge 7. The drill 6 is releasably fixed by a clamping screw 8 to a support member 9 slidably received in the bore 5. The drill 6 is provided with a depression 10 in which the screw 8 engages.

The centre 3 is mounted in the housing 1 for angular movement relative thereto by tapered roller bearings 11 provided to withstand axial thrust and radial forces exerted on the centre.

The inner end of the centre is provided with a brake cup 12 which co-operates with a correspondingly shaped brake cone 13 provided with a brake-lining 14 and mounted on a plate 15 axially movable within the housing 1. The plate 15 and cone 13 are connected to the housing to be angularly fast relative thereto by three equally angularly spaced screws 16 extending through openings 17 and 18 in the housing and plate and screwed into threaded bores 19 in the cone 13. A spring 20 is provided between the head of each screw 16 and the housing to bias the cone 13 away from the cup 12.

The inner end of the drill support member 9 extends through a bore 21 in the brake cone 13 and is provided with an enlarged head 22 received in a recess 23 between the cone 13 and plate 15 so that the member 9 and drill 6 will move axially with the plate 15 and cone 13, but can rotate relative to the plate and cone.

The cone 13 is moved axially into and out of engagement with the cup 12 by rotation of a cam 24 mounted in the housing. The cam is fixed on a shaft 25 extending perpendicular to the axis of the centre. The shaft 25 extends out of the housing and is provided at its outer end with a manually operable handle 26.

Movement of the plate 15 by the cam 24 also causes movement of member 9 and drill 6 axially of the centre.

In use of the above described assembly, the assembly is inserted into the tail stock barrel of the lathe and a workpiece is clamped in the lathe chuck which is rotated at a convenient speed. To centre drill the workpiece, the handle 26 is rotated to position the cam as shown in FIG. 2. In this position the plate 15 has been moved to engage the cone 13 with the cup 12 and to place the drill 6 in its extended position. The assembly is then advanced, by advancing the tail stock barrel, into contact with the end of the workpiece to be centre drilled. Drilling proceeds until the required depth of drill hole has been reached. It will be appreciated that during drilling the centre is dead, the brake preventing rotation of the centre.

When the required depth of drill hole has been reached, the handle 26 is returned to its initial position, returning the cam to the position shown in FIG. 1. The cone 13 is moved back under the bias of the springs 20 taking with it the member 9 and drill 6 which is thus returned to its retracted position. The consequent release of the brake frees the centre from the housing and the centre becomes live. Further advance of the tail stock barrel causes the centre to engage the drilled hole to centre the workpiece in the lathe for subsequent turning operations.

In the preferred embodiment the centre is made of chromium steel and is precision ground and heat treated. As is conventional the conical end of the centre includes a 60° angle. The drill is made from high speed steel or other cutting tool material. The cam may also be made of chromium steel.

There is thus provided a centering assembly by which a workpiece can be centre drilled and also centered in a lathe, thus obviating the need for a separate centre drilling machine or Jacob's chuck.

I claim:

1. A centering assembly for centering a workpiece on a lathe, said assembly comprising: a housing mountable in a lathe; a center member rotatably mounted in the housing and having an opening along its axis of rotation; a drill; a movable support member supporting the drill fast with the housing and in said opening; moving means for moving the support member so as to move the drill along said axis between a retracted position within the center member and an extended position for drilling a workpiece; and brake means comprising a cup-shaped surface formed on the center member, a conical surface formed on the moving means, and a brake lining on said conical surface, operation of the moving means to move the drill to said extended position being arranged to engage said brake lining with the cup-shaped surface, thereby preventing rotation of the center member.

2. A centering assembly for centering a workpiece in a lathe, said assembly comprising: a housing mountable in a lathe; a center member rotatably mounted in the housing and having an opening along its axis of rotation; a drill; a movable support member supporting said drill fast with the housing and in said opening; means for moving said support member so as to move the drill within said opening and thus along said axis of rotation between a retracted position with the center member and an extended position for drilling a workpiece; and brake means for holding the center member fast with the drill and support means when the drill is moved to its extended position.

3. A centering assembly as claimed in claim 2 including holding means for preventing rotation of said center member relative to said housing when said drill is in said extended position.

4. A centering assembly as claimed in claim 3 wherein said holding means comprises a brake having a first brake part formed in said center member and a second brake part mounted on said housing; and moving means for moving said parts into and out of engagement.

5. A centering assembly as claimed in claim 4 wherein said moving means includes a rotatable cam for moving said first and second brake parts into and out of engagement, and handle means for manual rotation of said cam.

6. A centering assembly as claimed in claim 5 wherein said support member is mounted on said second brake part.

7. A centering assembly as claimed in claim 4 including screws attached to said second brake part, said screws being slidably mounted in said housing for permitting said second brake part and said support member to move along the axis of rotation of said center member, and spring means cooperating with said screws and said housing so as to bias said second brake part into engagement with said cam.

8. A centering assembly as claimed in claim 2 including a roller bearing, said bearing rotatably mounting the center member in the housing.

9. A centering assembly as claimed in claim 2 wherein said housing includes a shank provided with a morse taper for mounting said housing in said lathe.

* * * * *